July 22, 1958
A. C. McKINNIS
2,844,634
RECOVERY OF NITROMETHANE FROM NITRATION MIXTURES
Filed April 30, 1956
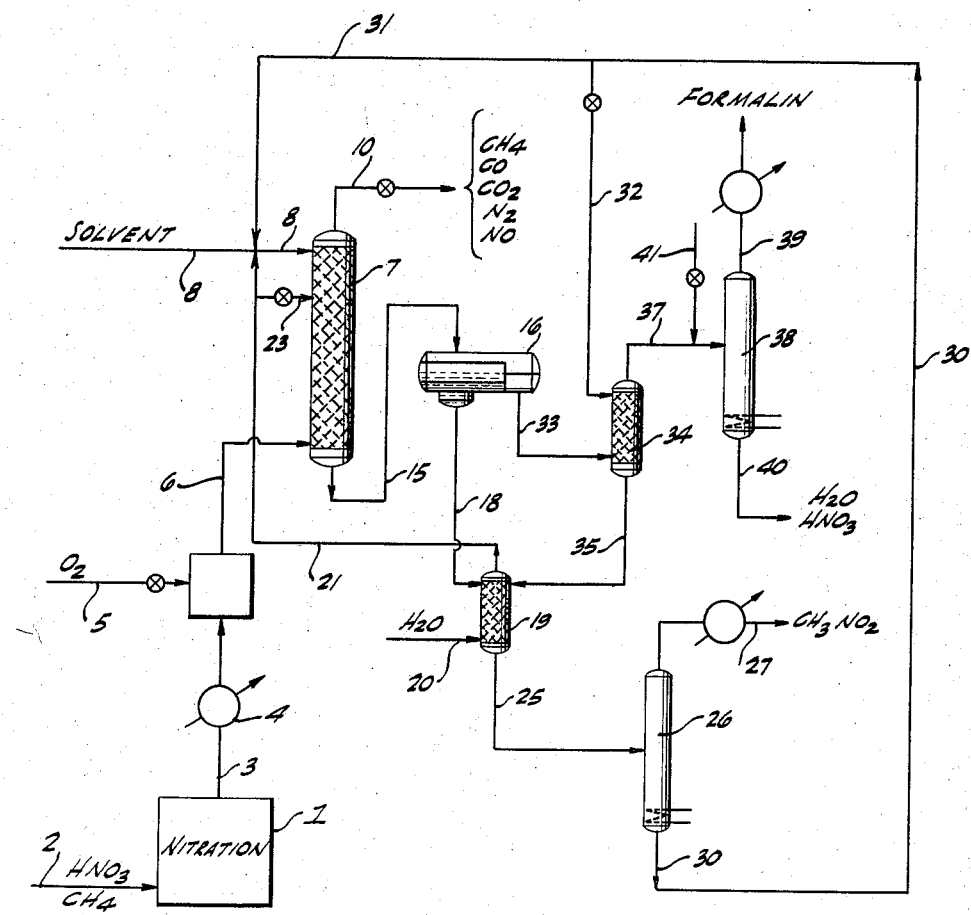
INVENTOR.
ART C. McKINNIS,
BY
Lannas S. Henderson
AGENT.

United States Patent Office 2,844,634
Patented July 22, 1958

2,844,634

RECOVERY OF NITROMETHANE FROM NITRATION MIXTURES

Art C. McKinnis, Long Beach, Calif., assignor, by mesne assignments, to Collier Carbon and Chemical Corporation, a corporation of California Application April 30, 1956, Serial No. 581,639

8 Claims. (Cl. 260—644)

This invention relates to the separation and recovery of nitromethane from the mixed nitration and oxidation products resulting from the nitration of methane, or other lower paraffin hydrocarbons, with nitric acid at elevated temperatures. In broad aspect, the invention contemplates as its most salient feature, contacting the nitration gases with a mixed-phase solvent, one phase of which is water, and the other phase of which is a halogenated aromatic hydrocarbon. The nitromethane is selectively dissolved by the halogenated aromatic hydrocarbon, while the formaldehyde and other oxidation products are selectively dissolved in the water phase. Following absorption, the mixed solvent is then allowed to stratify, and the aqueous phase treated for recovery of formaldehyde, and the organic solvent phase for recovery of nitromethane.

In the nitration of methane, or other lower paraffin hydrocarbons, with nitric acid, a mixture of products is obtained. Typical off-gases from such a nitration may contain not only unreacted methane, nitric acid and water, but also formaldehyde, carbon monoxide, carbon dioxide, nitric oxide, nitrous oxide, nitrogen, acetic acid, methanol; as well as the corresponding derivatives of higher hydrocarbons if such were present in the feed gas. The relative proportions of these materials varies considerably, depending upon the mole-ratio of nitric acid to methane originally employed, and also upon whether oxygen was added to the nitration mixture. The contact time and temperature of nitration also affects the relative proportions of nitromethane and by-products. In any case however, the resolution of the resulting products by heretofore known procedures is fraught with considerable difficulty.

Usually, the bulk of the nitromethane is separated by condensation, and the non-condensed gases are then scrubbed with water to remove formaldehyde, nitric acid and other water soluble materials. The gas residue from the water stripping operation may then be treated by oxidation with air or oxygen to convert any remaining nitric oxide to nitrogen dioxide, which may then be again treated with water to convert the nitrogen dioxide to nitric acid. The resulting nitric acid may then be recovered, concentrated and recycled to the nitration step. This recovery system is inherently expensive and cumbersome, and additional steps are required to obtain pure nitromethane and by-products. The original nitromethane which is condensed out contains dissolved formaldehyde and other organic materials, while the water extract obtained from the scrubbing operation will contain substantial amounts of dissolved nitromethane, along with the formaldehyde and other water solubles. The separation of nitromethane from aqueous solutions containing formaldehyde is very difficult because of the chemical reaction between formaldehyde and nitromethane. Other systems, which have been proposed for purifying the nitration products are similarly disadvantageous. Most of these difficulties stem from the fact that the nitration gases normally contain a large excess of unreacted methane, whereby simple condensation is ineffective to recover the bulk of the nitromethane.

Accordingly, the principal object of this invention is to provide economical means for separating and recovering in substantially pure form the principal nitration and oxidation products resulting from the high temperature nitration of lower paraffins with nitric acid. A specific object is to provide efficient means for separating nitromethane and formaldehyde. Another object is to purify unreacted methane for recycle to the nitration. Other objects will be apparent from the more detailed description which follows.

The nitration products herein concerned are those which result from the nitration of methane, ethane, propane, butane, and the like, or mixtures thereof, with nitric acid of any desired strength, e. g. 20% to 110%, at temperatures between about 400° and 600° C., and contact times between about 0.01 and 2.0 seconds, preferably between about 0.1 and 1.0 second. The hydrocarbon is necessarily employed in mole-excess over nitric acid. In the case of methane, between about 5 and 30 moles thereof per mole of $HNO_3$ may be employed, and preferably between about 8 and 12 moles. These preferred mole-ratios effectively utilize the nitric acid, and yet are not so high as to encumber unduly the subsequent purification system.

The nitration itself may be conducted according to known processes as e. g. that described in U. S. Patents 2,161,475 or 2,164,774, or alternatively according to the novel process described in my copending application Serial No. 452,688 filed August 27, 1954. Broadly speaking, these processes include preheating nitric acid and methane to incipient nitration temperature, then rapidly heating the mixture to the nitration temperature, maintaining the reaction temperature for the very short contact period, then rapidly quenching the reaction products to below reaction temperature. Under these general conditions, the product gases will ordinarily range in composition somewhat as follows:

TABLE

| Component: | Mole percent |
|---|---|
| Methane | 30–90 |
| Nitromethane | 0.5–10 |
| Formaldehyde | 0.5–10 |
| Water | 5–50 |
| Carbon monoxide | 2–10 |
| Carbon dioxide | 2–10 |
| Nitric oxide | 2–10 |
| Nitrogen | 2–10 |
| Nitrous oxide | 0–0.5 |
| Methanol | 0.1–2.0 |
| Acetic acid | 0–0.1 |

The relative proportion of nitromethane and formaldehyde depends to a large extent on the reaction conditions. High temperatures, e. g. 500°–550° C., tend to produce maximum amounts of nitromethane and minimum amounts of formaldehyde. The presence of oxygen in the nitration feed mixture will increase the relative proportion of formaldehyde. Selection of the optimum conditions for treating the reaction gases may rest primarily upon the ratio of nitromethane to formaldehyde which is present. This ratio may range anywhere between about 0.1 and 10 moles, usually between about 0.5 and 4 moles of formaldehyde per mole of nitromethane, depending upon the above noted factors.

The principal feature of novelty resides in scrubbing the reaction gases with a bi-phase mixture of water and halogenated aromatic hydrocarbon, preferably a chlorinated aromatic hydrocarbon. The halogenated solvent component will hereinafter be referred to as the organic component. The relative proportions of water and organic component to be employed will vary considerably, depending upon the relative proportions of nitromethane and formaldehyde in the off-gases. Normally, about 0.1 to 10 volumes of water is employed per volume of organic component, preferably between about 0.5 and 3 volumes of water.

It is preferred that the nitration gases be contacted with the bi-phase solvent mixture under conditions of substantial phase equilibrium, whereby each phase of the solvent is continuously equilibrated against the other phase, while in the presence of the nitration gases. A sequential contact of the nitration gases first with one component and then the other is normally not preferred, and in some cases will not be effective. Both nitromethane and formaldehyde are substantially soluble in the organic component in the absence of a water phase, and the formaldehyde so dissolved may tend to polymerize or react with the nitromethane rapidly. It is hence desirable to absorb the formaldehyde initially into the water phase. The most effective contacting and stripping is normally obtained under conditions of agitation, whereby the water phase and the organic phase are intimately dispersed one within the other. Countercurrent contacting of the mixed-phase solvent with the nitration gases is normally preferred, as by allowing the mixed solvent to flow downwardly through a glass bead packed column while the gases flow upwardly in contact therewith. Similarly, bubble cap columns may be employed, and such bubble cap columns offer the additional advantage of providing continuous agitation and intermixing of the two solvent phases.

The chlorinated aromatic hydrocarbons are normally preferred, mainly from the standpoint of economy. However, from an operative standpoint any of the brominated, or iodated aromatic hydrocarbons may likewise be employed. All of the chlorinated aromatic hydrocarbons boil substantially higher than nitromethane, and hence the extracted nitromethane may readily be separated therefrom by distillation, no azeotropes being formed. Examples of suitable chlorinated compounds include for example chlorobenzene, o-dichlorobenzene, m-dichlorobenzene, p-dichlorobenzene, o-chloro toluene, m-chloro toluene, p-chloro toluene, 1,2,3,-trichloro benzene, 1,2,4-trichloro benzene, 1,3,5-trichloro benzene, 2,3-dichloro toluene, 2,4-dichloro toluene 2,5-dichloro toluene, 2,6-dichloro toluene, 3,4-dichloro toluene, 3,5-dichloro toluene, 1,2,3,4-tetrachloro benzene, 1,2,4,5-tetrachloro benzene, penta-chloro benzene, hexa-chloro benzene, any of the chlorinated xylenes, chlorinated pseudocumenes, chlorinated mesitylenes and the like. Also the chlorinated naphthalene may be employed, e. g. alpha-chloro naphthalene, beta-chloro naphthalene, di-chloro naphthalene, tri-chloro naphthalene, etc. All of the above solvents, when in equilibrium with a water phase, are found to exhibit a remarkable selectivity for nitromethane as compared to formaldehyde. Any one or a mixture of such chlorinated aromatics may be employed.

The process may perhaps be more readily understood with reference to the accompanying flowsheet which illustrates one specific modification. This should not however be construed as limiting in scope.

The nitration reactor is indicated generally at 1, and this unit will not be described in detail since it forms no essential part of the invention. The feed-grass comprising nitric acid and methane, with or without added oxygen, are introduced through line 2, and passed through reactor 1 under the aforesaid nitration conditions. The nitration products are then taken off through line 3, and cooled to the desired extraction temperature in exchanger 4. If nitric oxide is present in the off-gases, it may be desirable to introduce additional oxygen via line 5 to oxidize the nitric oxide to nitrogen dioxide, which is subsequently converted to nitric acid. Normally however it is preferable to perform the extraction prior to oxidizing the nitric oxide. For this purpose the cooled gases, at for example 0°–200° C., are introduced via line 6 into the lower part of countercurrent stripping column 7. The mixed bi-phase solvent, comprising make-up and recycle water and halogenated hydrocarbon, is introduced at the top of the column through line 8 and trickles downwardly, countercurrently to the rising gases. The stripped gases are removed via line 10 for any desired subsequent use. These gases normally comprise mainly methane, with smaller proportions of carbon monoxide, carbon dioxide, nitrogen and nitric oxide. This mixture may be subjected to oxidation to convert the nitric oxide to nitrogen dioxide, then treated with water to form nitric acid which is recovered for re-use. The remaining gases may then be treated with caustic solutions or amines to remove carbon dioxide, and then either recycled directly to nitration step 1, or further purified by selective adsorption on activated charcoal as described for example in U. S. Patent 2,519,873, to separate out the bulk of the carbon monoxide and nitrogen, the remaining methane being then sufficiently pure for recycle to the nitration step.

Alternatively, the off-gases in line 10 may simply be subjected to caustic scrubbing or scrubbing with ethanolamine to remove carbon dioxide, and then utilized as fuel gas.

The mixed extract from column 7 is withdrawn through line 15 and transferred to a settling drum 16, wherein the liquid phases are allowed to stratify. The heavy organic phase is removed via line 18, and this phase contains substantially all the nitromethane plus a small amount of formaldehyde. To remove traces of formaldehyde, this mixture is subjected to countercurrent scrubbing in a small extraction column 19 with fresh water admitted through line 20. The water rises upwardly, countercurrently to the descending organic phase, and is removed overhead via line 21 and recycled to line 8, where it mingles with fresh and recycle solvent admitted to stripping column 7. Alternatively, this aqueous phase, containing small amounts of formaldehyde, may be diverted through line 23 and admitted at a point lower in column 7 than the primary solvent, whereby only fresh water is admitted through line 8, thereby removing all traces of formaldehyde from the upflowing gases in column 7.

According to another modification, the aqueous wash liquor in line 21 may be mingled with the primary aqueous phase withdrawn via line 33 from separator 16, and treated for nitromethane recovery in column 34, as hereinafter described.

The stripped organic solvent from column 19 is then transferred via line 25 to a distillation stripping column 26 wherein nitromethane is distilled overhead via line 27. If hydrocarbons higher than methane were employed, the product in line 27 will also contain higher nitro-paraffins, e. g. nitroethane, nitropropane and the like. These materials may be readily separated by further fractionation, as is well known.

The stripped organic solvent from column 26 is withdrawn through line 30, and the principal portion thereof recycled via line 31 to solvent feed line 8. A minor portion of the stripped organic solvent is diverted through line 32 for use as hereinafter described.

The aqueous phase which stratifies in separator 16, containing substantially all the formaldehyde, is withdrawn through line 33 and transferred to a secondary countercurrent solvent stripping column 34, wherein traces of dissolved nitromethane are removed by countercurrent scrubbing with a stream of regenerated chlorinated aromatic hydrocarbon which is admitted through line 32, this stream being derived from column 26 as previously described. The extract of nitromethane in chlorinated hydrocarbon recovered from column 34, containing also traces of formaldehyde, is then transferred via line 35 to water stripping column 19 for treatment along with the major nitromethane extract stream from line 18.

The aqueous raffinate from column 34 is withdrawn from the top of said column and transferred via line 37 to a distillation column 38. Column 38 is operated to take overhead via line 39 a commercial formalin mixture containing e. g. 20–30% of formaldehyde, together with traces of methanol and perhaps acetic acid. This mixture may either be utilized as such, or further purified as desired. The bottoms from column 38, withdrawn via line 40, may still contain nitric acid in proportions warranting recovery, and this solution may hence be subjected to distillation to concentrate the nitric acid for recycle to nitration step 1. Alternatively, the nitric acid may be neutralized with a suitable alkali such as ammonia, calcium hydroxide or the like, to prepare fertilizer nitrates. In this case, it may be desirable to admit stoichiometric proportions of the alkali via line 41, to the feed in line 37. In this manner, oxidation of formaldehyde during distillation in column 38 is minimized.

Obviously, many other variations in the above contacting procedure may be employed, and it is intended to include herein all such apparent modifications.

The following example is cited to illustrate specifically the selectivity of the solvents herein described.

*Example*

A gaseous nitration mixture derived from the nitration of methane with 70% nitric acid at 520° C., and containing 2% by volume nitromethane and 1% by volume of formaldehyde was bubbled with agitation through an 8" column of solvent mixture comprising 50% o-dichlorobenzene, and 50% water by volume, the contacting being effected at atmospheric pressure, 0° C., and at a rate of 5 s. c. f. per hour. It was found that essentially all of the nitromethane was absorbed from the gas stream. Only 3% of the total nitromethane went into the water phase, while only 0.2% of the formaldehyde was in the o-dichlorobenzene phase. Subsequent separation of the phases, and distillation of the dichlorobenzene extract resulted in substantially quantitative recovery of the nitromethane. By agitating the aqueous phase with an additional equal volume of fresh dichlorobenzene, and then subjecting the aqueous phase to distillation, a 30% formalin solution is obtained substantially free of nitromethane.

Substantially the same results are obtained when other chlorinated aromatic hydrocarbons are employed in the above example. The same results are not obtained when the nitration gases are sequentially contacted with water and chlorinated hydrocarbon, in either order; the two solvent phases must be in contact with each other, preferably during the initial contacting with the gases. However, as a non-preferred modification, the gases may be contacted with each solvent component sequentially, and the two phases then either mixed with each other, or separately extracted with fresh water in the case of the organic phase, and fresh chlorinated hydrocarbon in the case of the aqueous phase.

The foregoing disclosure should not be considered as limiting in scope since many variations may be made by those skilled in the art without departing from the scope or spirit of the following claims:

I claim:
1. A method for recovering nitromethane from gaseous products containing formaldehyde, said gaseous products resulting from the nitration of lower aliphatic hydrocarbon with nitric acid, which comprises contacting said gaseous products with a two-phase solvent comprising water and a halogenated aromatic hydrocarbon, separating the resulting organic phase from the aqueous phase, and recovering nitromethane from the organic phase.
2. A process as defined in claim 1 wherein said halogenated aromatic hydrocarbon is a chlorinated benzene.
3. A process as defined in claim 1 wherein said halogenated aromatic hydrocarbon is a dichlorobenzene.
4. A method for recovering nitromethane and formaldehyde from the gaseous products resulting from the nitration of methane with nitric acid at temperatures between about 400° and 600° C., which comprises contacting said gaseous reaction products with an intimate mixture of water and a halogenated aromatic hydrocarbon, allowing the liquid extract to stratify into an organic layer and an aqueous layer, recovering nitromethane from the organic layer, and recovering formaldehyde from the aqueous layer.
5. A process as defined in claim 4 wherein said halogenated aromatic hydrocarbon is a dichlorobenzene.
6. A method for recovering nitromethane and formaldehyde from the gaseous reaction products resulting from the nitration of methane with nitric acid at temperatures between about 400° and 600° C., which comprises countercurrently contacting and stripping said reaction gases with an intimate mixture of water and a halogenated aromatic hydrocarbon, allowing the liquid extract to stratify into an organic layer and an aqueous layer, subjecting said aqueous layer to countercurrent extraction with fresh halogenated aromatic hydrocarbon to remove traces of nitromethane, and recovering formaldehyde from the resulting aqueous raffinate, subjecting said organic layer to countercurrent extraction with fresh water to remove traces of formaldehyde, and recovering nitromethane from the water-striped organic raffinate.
7. A process as defined in claim 6 wherein said halogenated aromatic hydrocarbon is a dichlorobenzene.
8. A method for recovering nitromethane from a gaseous mixture containing formaldehyde, said gaseous mixture resulting from the nitration of a lower aliphatic hydrocarbon with nitric acid, which comprises contacting said gaseous mixture with both water and a halogenated aromatic hydrocarbon, thereby forming a water phase rich in formaldehyde and an organic phase rich in nitromethane, contacting said two phases with each other to establish equilibrium, separating the equilibrated organic phase and recovering nitromethane therefrom.

References Cited in the file of this patent
UNITED STATES PATENTS

| | | |
|---|---|---|
| 2,491,919 | Egly | Dec. 20, 1949 |
| 2,511,915 | Himel | June 20, 1950 |
| 2,580,742 | Doumani et al. | Jan. 1, 1952 |